US012763825B2

(12) United States Patent
Frank

(10) Patent No.: US 12,763,825 B2
(45) Date of Patent: Oct. 13, 2026

(54) ERROR VECTOR MAGNITUDE FOR TRANSMIT DIVERSITY

(71) Applicant: Lenovo (Singapore) Pte. Limited, Singapore (SG)

(72) Inventor: Colin Frank, Park Ridge, IL (US)

(73) Assignee: Lenovo (Singapore) Pte. Limited, Singapore (SG)

(*) Notice: Subject to any disclaimer, the term of this patent is extended or adjusted under 35 U.S.C. 154(b) by 0 days.

(21) Appl. No.: 18/857,899

(22) PCT Filed: Apr. 17, 2023

(86) PCT No.: PCT/IB2023/053917
§ 371 (c)(1),
(2) Date: Oct. 18, 2024

(87) PCT Pub. No.: WO2023/203464
PCT Pub. Date: Oct. 26, 2023

(65) Prior Publication Data

US 2025/0274175 A1 Aug. 28, 2025

Related U.S. Application Data

(60) Provisional application No. 63/332,463, filed on Apr. 19, 2022.

(51) Int. Cl.
*H04B 7/06* (2006.01)
*H04B 17/10* (2015.01)
*H04W 24/08* (2009.01)

(52) U.S. Cl.
CPC .......... *H04B 7/061* (2013.01); *H04B 17/101* (2015.01); *H04W 24/08* (2013.01)

(58) Field of Classification Search
CPC .......... H04B 7/10; H04B 1/3827; H04B 1/40; H04B 15/04; H04B 7/0482; H04B 7/0639;
(Continued)

(56) References Cited

U.S. PATENT DOCUMENTS 9,002,299 B2 * 4/2015 Perahia .......... H04L 25/03343 455/67.11
11,038,731 B2 * 6/2021 Fomin .......... H03F 3/24
(Continued)

FOREIGN PATENT DOCUMENTS

| | | | |
|---|---|---|---|
| EP | 1794908 | B1 | 7/2021 |
| WO | 2022029746 | A1 | 2/2022 |
| WO | 2023203464 | A1 | 10/2023 |

OTHER PUBLICATIONS

PCT/IB2023/053917 , "International Search Report and Written Opinion", PCT Application No. PCT/IB2023/053917, Jul. 6, 2023, 12 pages.

*Primary Examiner* — Eva Y Puente
(74) *Attorney, Agent, or Firm* — FIG. 1 Patents

(57) ABSTRACT

Various aspects of the present disclosure relate to a communication device that includes a transceiver, a set of transmit antennas (e.g., more than two transmit antennas), and a set of antenna connectors. Each of the antenna connectors couple a signal from the transceiver to a respective one of the transmit antennas. The communication device also includes a processor to cause the communication device to output a respective error vector magnitude (EVM) measurement value associated with each respective antenna connector for a determination of EVM for a transmit diversity of the set of transmit antennas.

20 Claims, 7 Drawing Sheets

(58) Field of Classification Search
CPC ...... H04B 17/327; H04B 1/16; H04B 7/0617; H04L 25/0264; H04L 1/0026; H04L 1/0029; H04L 1/1812; H04L 1/1861; H04L 1/20; H04L 5/0048; H04L 5/005; H04L 5/0051; H04W 24/08; H04W 52/146; H04W 52/241; H04W 52/242; H04W 52/26; H04W 52/346; H04W 52/383; H04W 76/14
See application file for complete search history.

(56) References Cited

U.S. PATENT DOCUMENTS

| | | | | |
|---|---|---|---|---|
| 11,211,964 | B1 * | 12/2021 | Chang | H04B 1/40 |
| 12,494,823 | B2 * | 12/2025 | Frank | H04B 7/005 |
| 2005/0095987 | A1 * | 5/2005 | Lyons | H04B 17/309 455/67.11 |
| 2009/0130989 | A1 * | 5/2009 | Rousu | H04B 17/18 455/73 |
| 2017/0155476 | A1 * | 6/2017 | Polehn | H04L 27/22 |
| 2021/0360537 | A1 * | 11/2021 | Maleki | H04W 52/20 |
| 2023/0014042 | A1 * | 1/2023 | Barak | H04L 5/0048 |
| 2023/0096115 | A1 * | 3/2023 | Sreenivasareddy | H04B 7/0413 455/552.1 |

* cited by examiner

ERROR VECTOR MAGNITUDE FOR TRANSMIT DIVERSITY

RELATED APPLICATION

This application claims priority to U.S. Provisional Application Ser. No. 63/332,463 filed Apr. 19, 2022, entitled "Error Vector Magnitude for Transmit Diversity," the disclosure of which is incorporated by reference herein in its entirety.

TECHNICAL FIELD

The present disclosure relates to wireless communications, and more specifically to error vector magnitude (EVM) for transmit diversity.

BACKGROUND

A wireless communications system may include one or multiple network communication devices, such as base stations, which may be otherwise known as an eNodeB (eNB), a next-generation NodeB (gNB), core network functions (CNFs), or other suitable terminology. Each network communication device, such as a base station, may support wireless communications for one or multiple user communication devices, which may be otherwise known as user equipment (UE), or other suitable terminology. The wireless communications system may support wireless communications with one or multiple user communication devices by utilizing resources of the wireless communication system, such as time resources (e.g., symbols, slots, subslots, minislots, aggregated slots, subframes, frames, or the like) or frequency resources (e.g., subcarriers, carriers). Additionally, the wireless communications system may support wireless communications across various radio access technologies (RATs) including third generation (3G) RAT, fourth generation (4G) RAT, fifth generation (5G) RAT, and other suitable RATs beyond 5G. In some cases, a wireless communications system may be a non-terrestrial network (NTN), which may support various communication devices for wireless communications in the NTN. For example, an NTN may include network entities onboard non-terrestrial vehicles such as satellites, unmanned aerial vehicles (UAV), and high-altitude platforms systems (HAPS), as well as network entities on the ground, such as gateway entities capable of transmitting and receiving over long distances.

A communication device, such as a UE or customer premise equipment (CPE), may determine an EVM based on unbiased linear minimum mean square error (MMSE). The EVM may be independent of a channel between a transmitter associated with the communication device and a receiver of a receiving device. However, in some cases, the EVM may be independent of a power distribution between two transmit antennas of the communication device. While the EVM may assume a noiseless receiver, the receiver may not be noiseless, such that a noise floor at a receiver output of the receiver might have some dependence on the power distribution at the transmitter associated with the communication device. In some other cases, given an EVM based on unbiased linear MMSE, the communication device may be configured to transmit using a small amount of power on one antenna because the EVM may be dependent on a minimum EVM of all transmit antennas of the communication device. In other cases, a transmit diversity EVM may be defined for a communication device with two transmit antennas. This transmit diversity EVM definition is based on a signal-to-noise ratio (SNR) at an output of a zero-forcing receiver (e.g., a virtual receiver) with an assumption of a suboptimal correlation of transmitter noise. Currently, only two transmit antenna requirements are defined for a communication device in radio performance and protocol aspects.

SUMMARY

The present disclosure relates to methods, apparatuses, and systems that support EVM for transmit diversity of a number of transmit antennas. By utilizing the described techniques, the EVM may be determined for more than two transmit antennas, such as may be utilized to implement a UE with four transmit antennas, for example. For transmit diversity, the same transmission signal is transmitted from all of the transmit antennas of a device except that a different linear or cyclic delay may be applied to the signal transmitted from each antenna, where the delay is less than the length of the cyclic prefix. The question is how to define the quality of that transmitted signal given that it is not clear what error may be seen at the receiver. To define a fundamental measure of the quality of the transmitted signal, the EVM is the metric that can be utilized to define the quality of a transmitted signal, such as transmitted from multiple antennas in a UE, and the EVM for transmit diversity can be calculated as one over the square root of SNR of the transmitter, represented as a percentage.

Aspects of the disclosure provides for determining EVM for transmit diversity of a transmitter of a communications device (e.g., a UE) with a number of transmit antennas. As described herein, the EVM can be measured for each of the transmit antennas separately and then combined using a power weighted averaging. The procedure for determining EVM for transmit antennas of a communication device assumes a linear zero-forcing receiver (e.g., a virtual receiver) of a receiving device with a suboptimal (e.g., worst case) correlation of the transmitter noise.

Some implementations of the method and apparatuses described herein may include outputting EVM measurement values and power measurements at a communication device (e.g., a UE). The communication device includes a transceiver, a set of transmit antennas (e.g., more than two transmit antennas), and a set of antenna connectors. Each of the antenna connectors couple a signal from the transceiver to a respective one of the transmit antennas. The communication device also includes a processor to cause the communication device to output a respective EVM measurement value associated with each respective transmit antenna for a determination of EVM for a transmit diversity of the set of transmit antennas.

In some implementations of the method and apparatuses described herein, the communication device (e.g., a UE) has four transmit antennas, and the processor can also cause the communication device to output a respective power measurement associated with each respective antenna connector for a determination of a power weighted linear combination of the EVM for the transmit diversity of the set of transmit antennas. The power weighted linear combination of the EVM for the transmit diversity is determined by applying a weighting factor to a linear combination of the respective EVM measurement value associated with each respective antenna connector based at least on the respective power measurement associated with each respective antenna connector. The linear combination of the respective EVM measurement value associated with each respective antenna connector is based at least on a correlation of noise values associated with the communication device. The EVM for the transmit diversity is a linear combination of the respective EVM measurement value associated with each respective antenna connector, and is defined as $$EVM \leq \frac{\sum_i P_i EVM_i}{\sum_i P_i},$$

which is a quotient of a summation of respective power measurements multiplied by the respective EVM measurement value associated with each respective antenna connector divided by a summation of the respective power measurements associated with each respective antenna connector.

Some implementations of the method and apparatuses described herein may include a communication device that includes a set of transmit antennas for which an EVM for transmit diversity is determinable from a linear combination of a respective EVM measurement value for each of the transmit antennas of the set of transmit antennas. The set of transmit antennas may be more than two transmit antennas, such as four transmit antennas.

In some implementations of the method and apparatuses described herein, the communication device (e.g., a UE) has four transmit antennas, and the respective EVM measurement value of a respective transmit antenna of the set of transmit antennas is output from a set of antenna connectors. Each of the antenna connectors couples a signal from a transceiver to a respective transmit antenna. The linear combination of the respective EVM measurement values is a power weighted linear combination based at least on a respective output power measurement associated with a respective antenna connector of a respective transmit antenna. The power weighted linear combination of the EVM for the transmit diversity is determined by applying a weighting factor to a linear combination of the respective EVM measurement value associated with each respective antenna connector based at least on the respective output power measurement associated with a respective antenna connector of a respective transmit antenna. The linear combination of the respective EVM measurement value associated with each respective transmit antenna is based at least on a correlation of noise values associated with the communication device. The EVM for the transmit diversity is defined as a quotient of a summation of respective power measurements multiplied by the respective EVM measurement value associated with each respective transmit antenna of the set of transmit antennas divided by a summation of the respective power measurements associated with each respective transmit antenna of the set of transmit antennas.

BRIEF DESCRIPTION OF THE DRAWINGS

Various aspects of the present disclosure for EVM for transmit diversity are described with reference to the following Figures. The same numbers may be used throughout to reference like features and components shown in the Figures.

DETAILED DESCRIPTION

Figure 1:
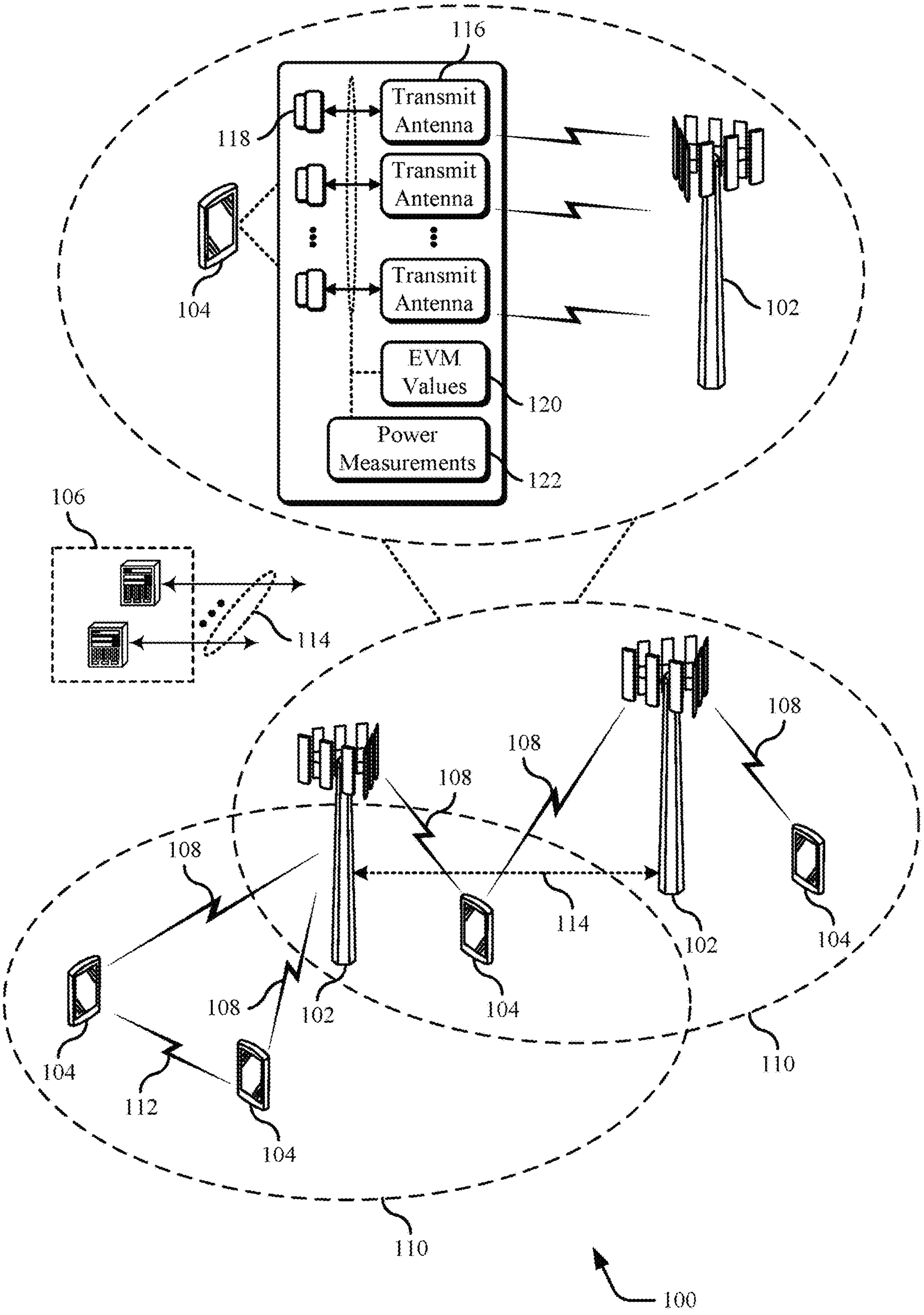
FIG. 1 illustrates an example of a wireless communications system that supports EVM for transmit diversity in accordance with aspects of the present disclosure.

Implementations of EVM for transmit diversity are described, such as related to a number of transmit antennas. By utilizing the described techniques, the EVM may be determined for more than two transmit antennas, such as may be utilized to implement a communication device (e.g., a UE) with four transmit antennas, for example. For transmit diversity, the same transmission signal is transmitted from all of the transmit antennas of a communication device except that a different linear or cyclic delay may be applied to the signal transmitted from each antenna, where the delay is less than the length of the cyclic prefix. The question is how to define the quality of the transmitted signal given that it is not clear what error may be seen at the receiver of a receiving device. To define a fundamental measure of the quality of the transmitted signal, the EVM is the metric that can be utilized to define the quality of a transmitted signal, such as transmitted from multiple antennas of a communication device, and the EVM for transmit diversity can be calculated as one over the square root of SNR of the transmitter, represented as a percentage.

The transmit diversity EVM is defined for a communication device with two transmit antennas. This transmit diversity EVM definition is based on a SNR at an output of a zero-forcing receiver (e.g., a virtual receiver unless per-antenna reference symbols are transmitted) with an assumption of a suboptimal correlation of transmitter noise. Currently, only two transmit antenna requirements are defined for a communication device in radio performance and protocol aspects. Further consideration takes into account that a frequency range 1 (FR1) device, such as a communication device, a UE, a gNB, or other type of CPE, may include four transmit antennas. This disclosure addresses how to determine transmit diversity EVM for a wireless communication device with four transmit antennas. Further, the transmit diversity EVM described herein is extendable and applicable for a wireless communication device with an N-number of transmit antennas.

Aspects of the disclosure provides for determining EVM transmit diversity of a transmitter of a communication device (e.g., a UE) with an N-number of transmit antennas. As described herein, the EVM can be measured for each of the transmit antennas separately and then combined using a power weighted averaging. The procedure for determining EVM assumes a linear zero-forcing receiver (e.g., a virtual receiver at a receiving device) with a suboptimal (e.g., worst case) correlation of the transmitter noise.

There are other possible solutions to consider for transmit diversity EVM, including linear MMSE and a pseudo-inverse receiver (max-ratio combiner). However, with a linear MMSE receiver, the resulting EVM is independent of the power transmitted on each antenna. Further, the pseudo-inverse receiver may be used, but the EVM measured in a conductive test without antenna coupling is likely to be very optimistic. The approach described in this disclosure determines the EVM for four transmit antennas (or an N-number of antennas) based on the SNR at the output of a zero-forcing receiver (e.g., a virtual receiver) with suboptimal antenna correlation.

Aspects of the present disclosure are described in the context of a wireless communications system. Aspects of the present disclosure are further illustrated and described with reference to device diagrams and flowcharts that relate to EVM for transmit diversity.

FIG. 1 illustrates an example of a wireless communications system 100 that supports EVM for transmit diversity in accordance with aspects of the present disclosure. The wireless communications system 100 may include one or more base stations 102, one or more UEs 104, and a core network 106. The wireless communications system 100 may support various radio access technologies. In some implementations, the wireless communications system 100 may be a 4G network, such as an LTE network or an LTE-Advanced (LTE-A) network. In some other implementations, the wireless communications system 100 may be a 5G network, such as a NR network. In other implementations, the wireless communications system 100 may be a combination of a 4G network and a 5G network. The wireless communications system 100 may support radio access technologies beyond 5G. Additionally, the wireless communications system 100 may support technologies, such as time division multiple access (TDMA), frequency division multiple access (FDMA), or code division multiple access (CDMA), etc.

The one or more base stations 102 may be dispersed throughout a geographic region to form the wireless communications system 100. One or more of the base stations 102 described herein may be, or include, or may be referred to as a base transceiver station, an access point, a NodeB, an eNodeB (eNB), a next-generation NodeB (gNB), a Radio Head (RH), a relay node, an integrated access and backhaul (IAB) node, or other suitable terminology. A base station 102 and a UE 104 may communicate via a communication link 108, which may be a wireless or wired connection. For example, a base station 102 and a UE 104 may perform wireless communication over a NR-Uu interface.

A base station 102 may provide a geographic coverage area 110 for which the base station 102 may support services (e.g., voice, video, packet data, messaging, broadcast, etc.) for one or more UEs 104 within the geographic coverage area. For example, a base station 102 and a UE 104 may support wireless communication of signals related to services (e.g., voice, video, packet data, messaging, broadcast, etc.) according to one or multiple radio access technologies. In some implementations, a base station 102 may be moveable, such as when implemented as a gNB onboard a satellite or other non-terrestrial station (NTS) associated with a non-terrestrial network (NTN). In some implementations, different geographic coverage areas 110 associated with the same or different radio access technologies may overlap, and different geographic coverage areas 110 may be associated with different base stations 102. Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The one or more UEs 104 may be dispersed throughout a geographic region or coverage area 110 of the wireless communications system 100. A UE 104 may include or may be referred to as a mobile device, a wireless device, a remote device, a handheld device, a customer premise equipment (CPE), a subscriber device, or as some other suitable terminology. In some implementations, the UE 104 may be referred to as a unit, a station, a terminal, or a client, among other examples. Additionally, or alternatively, a UE 104 may be referred to as an Internet-of-Things (IoT) device, an Internet-of-Everything (IoE) device, or as a machine-type communication (MTC) device, among other examples. In some implementations, a UE 104 may be stationary in the wireless communications system 100. In other implementations, a UE 104 may be mobile in the wireless communications system 100, such as an earth station in motion (ESIM).

The one or more UEs 104 may be devices in different forms or having different capabilities. Some examples of UEs 104 are illustrated in FIG. 1. A UE 104 may be capable of communicating with various types of devices, such as the base stations 102, other UEs 104, or network equipment (e.g., the core network 106, a relay device, a gateway device, an integrated access and backhaul (IAB) node, a location server that implements the location management function (LMF), or other network equipment). Additionally, or alternatively, a UE 104 may support communication with other base stations 102 or UEs 104, which may act as relays in the wireless communications system 100.

A UE 104 may also support wireless communication directly with other UEs 104 over a communication link 112. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V 2X deployments, the communication link 112 may be referred to as a sidelink. For example, a UE 104 may support wireless communication directly with another UE 104 over a PC5 interface.

A base station 102 may support communications with the core network 106, or with another base station 102, or both. For example, a base station 102 may interface with the core network 106 through one or more backhaul links 114 (e.g., via an S1, N2, or other network interface). The base stations 102 may communicate with each other over the backhaul links 118 (e.g., via an X2, Xn, or another network interface). In some implementations, the base stations 102 may communicate with each other directly (e.g., between the base stations 102). In some other implementations, the base stations 102 may communicate with each other indirectly (e.g., via the core network 106). In some implementations, one or more base stations 102 may include subcomponents, such as an access network entity, which may be an example of an access node controller (ANC). The ANC may communicate with the one or more UEs 104 through one or more other access network transmission entities, which may be referred to as remote radio heads, smart radio heads, gateways, transmission-reception points (TRPs), and other network nodes and/or entities.

The core network 106 may support user authentication, access authorization, tracking, connectivity, and other access, routing, or mobility functions. The core network 106 may be an evolved packet core (EPC), or a 5G core (5GC), which may include a control plane entity that manages access and mobility (e.g., a mobility management entity (MME), an access and mobility management functions (AMF)), and a user plane entity that routes packets or interconnects to external networks (e.g., a serving gateway (S-GW), a Packet Data Network (PDN) gateway (P-GW), or a user plane function (UPF)). In some implementations, the control plane entity may manage non-access stratum (NAS) functions, such as mobility, authentication, and bearer management for the one or more UEs 104 served by the one or more base stations 102 associated with the core network 106.

According to implementations, a UE 104 is operable to implement various aspects of EVM for transmit diversity, as described herein. For instance, a UE 104 includes a transceiver and an N-number of transmit antennas 116 (e.g., more than two transmit antennas, such as four transmit antennas), as well as antenna connectors 118 that are each configured to couple a transmission signal from the transceiver to a respective one of the transmit antennas. The device can include a processor and/or communications manager (e.g., any one or more combination of components) configured to cause the UE to output a respective EVM measurement value 120 associated with each respective antenna connector for a determination of EVM for a transmit diversity of the set of transmit antennas. Additionally, a processor and/or communications manager (e.g., any one or more combination of components) is configured to cause the UE to output a respective power measurement 122 associated with each respective antenna connector for a determination of a power weighted linear combination of the EVM for the transmit diversity of the set of transmit antennas. The power weighted linear combination of the EVM for the transmit diversity can be determined by applying a weighting factor to a linear combination of the respective EVM measurement value associated with each respective antenna connector based at least in part on the respective power measurement associated with each respective antenna connector.

Figure 2:
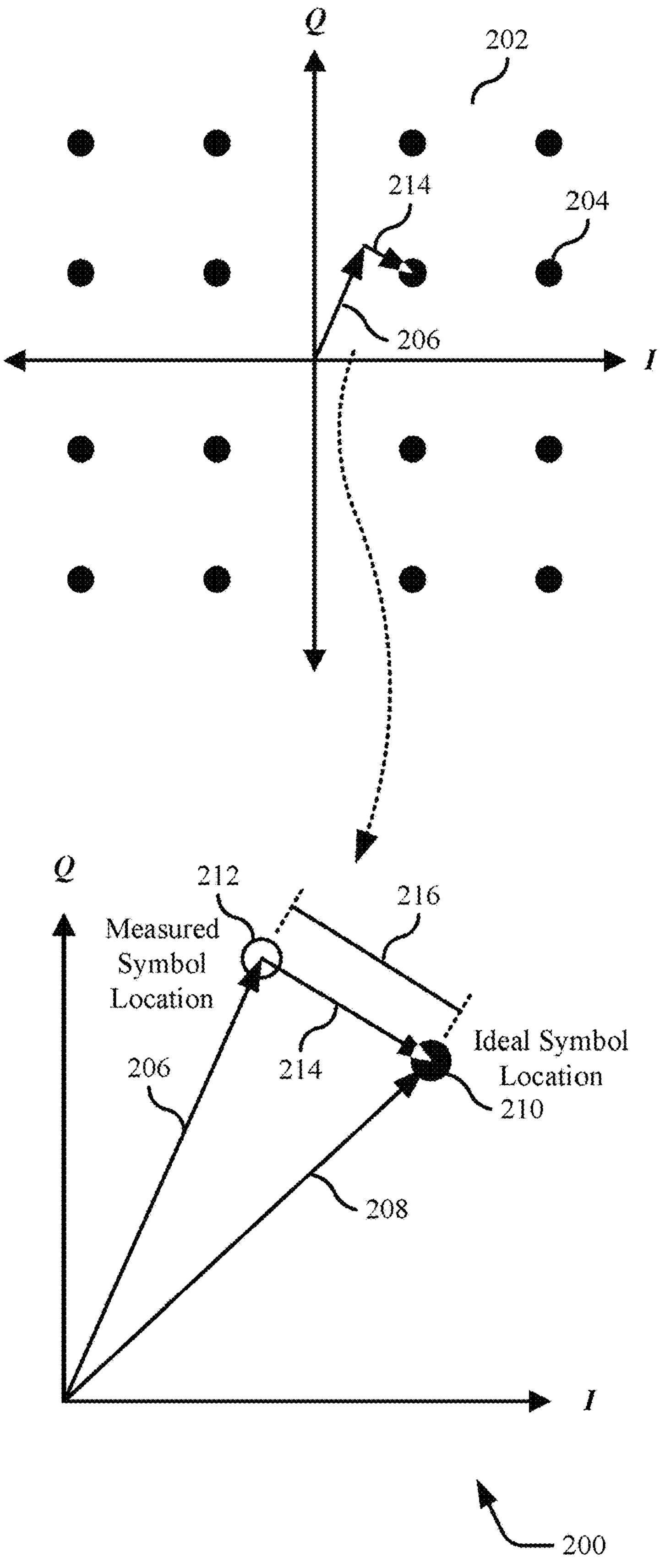
FIG. 2 illustrates an example of a transmit constellation and error vector as related to EVM for transmit diversity in accordance with aspects of the present disclosure

FIG. 2 illustrates an example 200 of a transmit constellation and error vector as related to EVM for transmit diversity in accordance with aspects of the present disclosure. In this example 200, the transmitter (e.g., transceiver) of the UE 104 may be transmitting a 16-QAM constellation, represented in an I-Q plane 202. For an ideal constellation, the location of the transmit points 204 are known, however when transmitted, symbols may not transmit at the exact intended location of the constellation points. For example, an imperfect radio may not transmit the intended symbol, as represented by the actual signal vector 206. The difference between an ideal signal vector 208 for an ideal symbol location 210 and the actual signal vector 206 transmitted to a measured symbol location 212 is the error vector 214. The square of the magnitude 216 of the error vector 214 can be averaged over many symbols after which this mean-square average is normalized by the average power of the constellation. The EVM is then defined as one-hundred (100) times the square-root of the normalized mean-square error.

As noted above, a transmit diversity EVM definition has been established for a UE with two transmit antennas, for single layer transmissions and transmission from an antenna port using a multiple input multiple output (MIMO) receiver. The transmit diversity EVM definition for a two transmit antennas device is based on the SNR at the output of a zero-forcing receiver with the assumption of worst-case correlation of the transmitter noise. The current transmit diversity EVM definition takes into account evaluating EVM for the antenna port or single layer transmission in which a MIMO receiver is used, and a matrix precoder W is given by:

$$W = \begin{bmatrix} w_1 \\ w_2 \end{bmatrix}$$

where the 1×2 precoding vector $w_1$ is used to transmit the single layer of data, and the 1×2 matrix $w_2$ has unit norm and is orthogonal to $w_1$. If the channel H has full rank, the data can be estimated as:

$$\hat{x} = W^{-1}H^{-1}y = W^{-1}H^{-1}H(Wx+n) = x + v$$

where $v=W^{-1}nv=W^{H}n$, and where the second outputs of $\hat{x}=[\hat{x}_1\ \hat{x}_2]^T$ and $v=[v_1\ v_2]^T$ can be ignored. It is noted generally that the gNB does not invert the channel for single-layer transmission unless per antenna reference symbols are transmitted. However, the SNR that results with the use of this receiver can be considered.

With the zero-forcing receiver, the noise measured at the first output of the receiver is given by:

$$v_1 = w_1^H n.$$

with a variance given by:

$$E|v_1|^2 = w_1^H E(nn^H)w_1 = w_1^H \sum w_1 = w_1^H W \sum' W^H w_1$$

where:

$$\sum' = E[n'n'^H] = \begin{bmatrix} \sigma_1^2 & \varepsilon \\ \varepsilon^* & \sigma_2^2 \end{bmatrix} \text{ and } n' = \begin{bmatrix} w_0^{-1}n_0 \\ w_1^{-1}n_1 \end{bmatrix}.$$

Note that the variance $E|v_1|^2$ is independent of the channel H so that the EVM is also independent of the channel H. In the event the transmitter noise is uncorrelated so that Σ' is diagonal, the noise variance is given by:

$$E|v_1|^2 = |w_{1,0}|^4\sigma_1^2 + |w_{1,1}|^4\sigma_2^2$$

and the EVM is given by:

$$EVM = 100\sqrt{E|v_1|^2} = \sqrt{|w_{1,0}|^4 EVM_1^2 + |w_{1,1}|^4 EVM_2^2}$$

where $|w_{1,0}|^2+|w_{1,1}|=1$. In the special case in which $|w_{1,0}|^2=|w_{1,1}|=1/2$, then:

$$EVM = \frac{1}{2}\sqrt{EVM_1^2 + EVM_2^2}$$

and in the case that $EVM_1=EVM_2$, this becomes:

$$EVM = \frac{1}{\sqrt{2}}EVM_1$$

In the more general case in which transmitter noise is correlated so that E' is not diagonal, the noise variance is given by:

$$EVM = \sqrt{|w_{1,0}|^4 EVM_1^2 + |w_{1,1}|^4 EVM_2^2 + 210^4 |w_{1,0}|^2 |w_{1,1}|^2 Re(\varepsilon)} \le \sqrt{|w_{1,0}|^4 EVM_1^2 + |w_{1,1}|^4 EVM_2^2 + 210^4 |w_{1,0}|^2 |w_{1,1}|^2 |\varepsilon|} = \sqrt{|w_{1,0}|^4 EVM_1^2 + |w_{1,1}|^4 EVM_2^2 + 210^4 |w_{1,0}|^2 |w_{1,1}|^2 \rho\sigma_1\sigma_2} = \sqrt{|w_{1,0}|^4 EVM_1^2 + |w_{1,1}|^4 EVM_2^2 + 2\rho |w_{1,0}|^2 |w_{1,1}|^2 EVM_1 EVM_2}$$

where $\rho=|\varepsilon|/\sigma_1\sigma_2$. This can be further expressed as:

$$= \sqrt{|w_{1,0}|^4 EVM_1^2 + (1-|w_{1,0}|^2)^2 \beta^2 EVM_1^2 + 2\rho\beta |w_{1,0}|^2 (1-|w_{1,0}|^2) EVM_1^2} = EVM_1 \sqrt{|w_{1,0}|^4 + \beta^2 (1-|w_{1,0}|^2)^2 + 2\rho\beta |w_{1,0}|^2 (1-|w_{1,0}|^2)} = EVM_1 \sqrt{|w_{1,0}|^4 + \beta(1-|w_{1,0}|^2)(\beta(1-|w_{1,0}|^2) + 2\rho |w_{1,0}|^2)} = EVM_1 \sqrt{|w_{1,0}|^4 + \beta(1-|w_{1,0}|^2)(\beta(1-|w_{1,0}|^2) + 2\rho |w_{1,0}|^2)} = EVM_1 \sqrt{\gamma^2 + \beta(1-\gamma)(\beta(1-\gamma) + 2\rho\gamma)}$$

where $\beta=EVM_2/EVM_1$ and $\gamma=|w_{1,0}|$, and where $|w_{1,0}|+|w_{1,1}|=1$.

If the correlation $\varepsilon$ cannot be measured by the test equipment, then since $|\varepsilon| \le \sigma_1\sigma_2$, it follows that:

$$EVM \le \sqrt{|w_{1,0}|^4 EVM_1^2 + |w_{1,1}|^4 EVM_2^2 + 2|w_{1,0}|^2 |w_{1,1}|^2 EVM_1 EVM_2} = |w_{1,0}|^2 EVM_1 + |w_{1,1}|^2 EVM_2 = |w_{1,0}|^2 EVM_1 + (1-|w_{1,0}|^2) EVM_2 = EVM_1(\beta + |w_{1,0}|^2(1-\beta))$$

where $\beta=EVM_2/EVM_1$.

In the Way Forward R4-2008465, EVM is defined as:

$$EVM_{WF} = \sqrt{(P_1 * EVM_1^2 + P_2 * EVM_2^2)/(P1+P2)} = \sqrt{|w_{1,0}|^2 EVM_1^2 + |w_{1,1}|^2 EVM_2^2} = \sqrt{|w_{1,0}|^2 EVM_1^2 + (1-|w_{1,0}|^2) EVM_2^2} = EVM_1 \sqrt{|w_{1,0}|^2 + (1-|w_{1,0}|^2)\beta^2} = EVM_1 \sqrt{\beta^2 + \gamma(1-\beta^2)}$$

In the special case in which $EVM_1=EVM_2$, then:

$$EVM \le |w_{1,0}|^2 EVM_1 + (1-|w_{1,0}|^2) EVM_1 = EVM_1$$

and $$EVM_{WF} = \sqrt{|w_{1,0}|^2 EVM_1^2 + (1-|w_{1,0}|^2) EVM_1^2} = EVM_1$$

noting that the expressions are the same.

The ratio of the proposed EVM definition using the MIMO receiver relative to the EVM definition is a function of $\beta=EVM_2/EVM_1$, $\gamma=|_{1,0}|^3=P_1/(P_1+P_2)$, and the correlation coefficient $\rho=|\varepsilon|/\sigma_1\sigma_2$ of the transmitter. This ratio is given by:

$$\frac{EVM}{EVM_{WF}} = \frac{EVM_1\sqrt{\gamma^2 + \beta(1-\gamma)(\beta(1-\gamma) + 2\rho\gamma)}}{EVM_1\sqrt{\beta^2 + \gamma(1-\beta^2)}} = \frac{\sqrt{\gamma^2 + \beta(1-\gamma)(\beta(1-\gamma) + 2\rho\gamma)}}{\sqrt{\beta^2 + \gamma(1-\beta^2)}}.$$

Combining equations results in a transmit diversity EVM definition of:

$$EVM \le |w_{1,0}|^2 EVM_1 + |w_{1,1}|^2 EVM_2 = \frac{P_1}{P_1+P_2} EVM_1 + (1-|w_{1,0}|^2) EVM_2 = \frac{P_1}{P_1+P_2} EVM_1 + \frac{P_2}{P_1+P_2} EVM_2 = \frac{P_1 EVM_1 + P_2 EVM_2}{P_1+P_2}.$$

where $EVM_1$ is measured at a first antenna connector, $EVM_2$ is measured at a second antenna connector, $P_1$ is the power at the first antenna connector, and $P_2$ is the power at the second antenna connector.

In aspects of EVM for transmit diversity, and as described above, the following expression gives an upper bound on the EVM for transmit diversity with two transmit antennas for a zero-forcing receiver with the assumption of worst-case correlation of the transmitter noise:

$$EVM \le \frac{P_1 EVM_1 + P_2 EVM_2}{P_1+P_2}.$$

Although this expression of the EVM for transmit diversity with two transmit antennas can be extended to accommodate any number of transmit antennas, aspects of the described EVM for transmit diversity provides a simpler inductive method. As an example of EVM for transmit diversity extended to accommodate any number of transmit antennas, an instance of three transmit antennas is considered. From the above expression, the transmit diversity for two transmit antennas is bounded by:

$$EVM \le \frac{P_1 EVM_1 + P_2 EVM_2}{P_1+P_2}$$

The first two transmit antennas can be considered as a single virtual antenna with power $P_1+P_2$ and EVM equal to $$\frac{P_1 EVM_1 + P_2 EVM_2}{P_1+P_2}.$$

Using the two-antenna result, the EVM for the virtual antenna when combined with the third transmit antenna is given by:

$$EVM \le \frac{P_V EVM_V + P_3 EVM_3}{P_V + P_3} = \frac{(P_1+P_2)\frac{P_1 EVM_1 + P_2 EVM_2}{P_1+P_2} + P_3 EVM_3}{(P_1+P_2)+P_3} = \frac{P_1 EVM_1 + P_2 EVM_2 + P_3 EVM_3}{P_1+P_2+P_3}$$

where $P_V$ represents the virtual antenna power and $EVM_V$ represents the virtual antenna EVM. Utilizing the same approach, this result can be extended to an arbitrary number of transmit antennas as:

$$EVM \le \frac{\sum_i P_i EVM_i}{\sum_i P_i}$$

Notably, the EVM for an implementation of a device, such as a UE, with a fourth transmit antenna can be determined as a linear combination of the first three transmit antennas, as indicated in the equations above, where the first three transmit antennas are virtualized and combined with the fourth transmit antenna, such as given by:

$$EVM \le \frac{P_V EVM_V + P_4 EVM_4}{P_V + P_4} = \frac{(P_1 + P_2 + P_3)\frac{P_1 EVM_1 + P_2 EVM_2 + P_3 EVM_3}{P_1 + P_2 + P_3} + P_4 EVM_4}{(P_1 + P_2 + P_3) + P_4} = \frac{P_1 EVM_1 + P_2 EVM_2 + P_3 EVM_3 + P_4 EVM_4}{P_1 + P_2 + P_3 + P_4}$$

From the analysis above for two antennas and two precoders:

$$W = \begin{bmatrix} w_1 \\ w_2 \end{bmatrix}$$

where the 1×2 precoding vector $w_1$ is used to transmit the single layer of data and the 1×2 matrix $w_2$ has unit norm and is orthogonal to $w_1$. If the channel H has full rank, the data can be estimated as:

$$\hat{x} = W^{-1}H^{-1}y = W^{-1}H^{-1}H(Wx + n) = x + v,$$

where $v=W^{-1}nv=W^{H}n$, and where the second outputs of $\hat{x}=[\hat{w}_1\ \hat{x}_2]^T$ and $v=[v_1\ v_2]^T$ can be ignored.

In the case of N transmit antennas:

$$W = \begin{bmatrix} w_1 \\ \vdots \\ w_N \end{bmatrix}$$

where the 1×N precoding vector $w_1$ is used to transmit the single layer of data and the remaining $w_i$, $2 \le i \le N$, have unit norm and are orthogonal to $w_1$. If the channel H has full rank, the data can be estimated as:

$$\hat{x} = W^{-1}H^{-1}y = W^{-1}H^{-1}H(Wx + n) = x + v,$$

where $v=W^{-1}nv=W^{H}n$, and where the outputs $x_i$, $2 \le i \le N$ and $v_i$, $2 \le i \le N$ can be ignored.

With a zero-forcing receiver, the noise measured at the first output of the receiver is given by:

$$v_1 = w_1^H n$$

with variance given by:

$$E|v_1|^2 = w_1^H E(nn^H)w_1 = w_1^H \Sigma w_1 = w_1^H W \Sigma' W^H w_1,$$

where:

$$\Sigma' = E[n' n'^H] = \begin{bmatrix} \sigma_1^2 & \dots & \varepsilon_{1,N} \\ \vdots & \ddots & \vdots \\ \varepsilon_{1,N}^* & \dots & \sigma_N^2 \end{bmatrix} \text{ and } n' = \begin{bmatrix} w_{1,0}^{-1} n_0 \\ \vdots \\ w_{1,N-1}^{-1} n_{N-1} \end{bmatrix}$$

and $$\varepsilon_{i,j} = E(n_i' n_j'^*).$$

Expanding and using the fact that $$\varepsilon_{i,j} = \varepsilon_{i,j}^*,$$

this gives:

$$\begin{aligned} E|v_1|^2 &= \sum_{i=0}^{N-1}\sum_{j=0}^{N-1} |w_{1,i}|^2 |w_{1,j}|^2 \varepsilon_{i,j} \\ &= \sum_{i=0}^{N-1}\sum_{j=0}^{i-1} |w_{1,i}|^2 |w_{1,j}|^2 (\varepsilon_{ii,j} + \varepsilon_{j,i}) + \sum_{j=0}^{N-1} \left|w_{1,j}^2\right|^2 \varepsilon_{j,j} \\ &= \sum_{i=0}^{N-1}\sum_{j=0}^{i-1} 2|w_{1,i}|^2 |w_{1,j}|^2 Re(\varepsilon_{i,j}) + \sum_{j=0}^{N-1} \left|w_{1,j}^2\right|^2 \varepsilon_{j,j}, \le \\ &\sum_{i=0}^{N-1}\sum_{j=0}^{i-1} 2|w_{1,i}|^2 |w_{1,j}|^2 |\varepsilon_{i,j}| + \sum_{j=0}^{N-1} \left|w_{1,j}^2\right|^2 |\varepsilon_{j,j}| \end{aligned}$$

Let $\rho_{i,j}=|\varepsilon_{i,j}/\sigma_i\sigma_j$; and note that $\rho_{i,j} \le 1$, so that:

$$\begin{aligned} E|v_1|^2 &\le \sum_{i=0}^{N-1}\sum_{j=0}^{i-1} 2|w_{1,i}|^2 |w_{1,j}|^2 \rho_{i,j}\sigma_i\sigma_j + \sum_{j=0}^{N-1} \left|w_{1,j}^2\right|^2 \rho_{j,j}\sigma_j^2 \le \\ &\sum_{i=0}^{N-1}\sum_{j=0}^{i-1} 2|w_{1,i}|^2 |w_{1,j}|^2 \sigma_i\sigma_j + \sum_{j=0}^{N-1} |w_{1,j}|^4 \sigma_j^2 \le \\ &\sum_{i=0}^{N-1}\sum_{j=0}^{i-1} 2|w_{1,i}|^2 |w_{1,j}|^2 \sigma_i\sigma_j + \sum_{j=0}^{N-1} |w_{1,j}|^4 \sigma_j^2 \le \left(\sum_{i=0}^{N-1} |w_{1,i}|^2 \sigma_i\right)^2. \end{aligned}$$

The EVM at the output of the zero-forcing receiver is:

$$EVM = 100\sqrt{E|v_1|^2},$$

while the EVM measured at the i-th antenna is given by:

$$EVM_i = 100 * \sigma_i.$$

Using the result from above, have:

$$EVM = 100\sqrt{E|v_1|^2} \leq 100\sum_{i=0}^{N-1}|w_{1,i}|^2\sigma_i = \sum_{i=0}^{N-1}|w_{1,i}|^2 100\sigma_i = \sum_{i=0}^{N-1}|w_{1,i}|^2 EVM_i$$

Let $P_i$ denote the power measured on the i-th antenna and let the total power P be defined as $$P = \sum_{i=0}^{N-1} P_i.$$

Since the power transmitted on the i-th antenna is given by:

$$P_i = |w_{1,i}|^2,$$

it follows that the total power P is given by:

$$P = \sum_{i=0}^{N-1} P_i = \sum_{i=0}^{N-1} |w_{1,i}|^2 = 1,$$

using the assumption in the definition of the zero-forcing receiver that $$\sum_{i=0}^{N-1} |w_{1,i}|^2 = 1.$$

From this, it follows that:

$$EVM \leq \sum_{i=0}^{N-1} |w_{1,i}|^2 EVM_i = \sum_{i=0}^{N-1} P_i EVM_i = \frac{1}{P}\sum_{i=0}^{N-1} P_i EVM_i = \frac{\sum_{i=0}^{N-1} P_i EVM_i}{\sum_{i=0}^{N-1} P_i}.$$

In summary, for a zero-forcing receiver with worst case correlation of the transmitter noise, an upper bound on the EVM can be expressed as:

$$EVM \leq \frac{\sum_{i=0}^{N-1} P_i EVM_i}{\sum_{i=0}^{N-1} P_i}$$

In other aspects of EVM for transmit diversity, an alternative is to utilize a linear unbiased MMSE receiver, and for a worst-case correlation of the transmitter noise, the EVM for transmit diversity with an N-number of transmit antennas can be bounded by:

$$EVM = \min(EVM_1, EVM_2, \ldots, EVM_N)$$

However, with this approach, the resulting EVM is independent of the power transmitted on each antenna.

In other aspects of EVM for transmit diversity, another alternative is to utilize the pseudo-inverse receiver (also known as the maximum-ratio combiner) to define EVM. The pseudo-inverse receiver can be defined for any number of antennas N as:

$$\hat{x} = \frac{(Hw)^H}{(Hw)^H Hw} y$$

and the EVM is defined as:

$$EVM = \frac{100}{\sqrt{SNR}}$$

where the SNR is measured at the output of the pseudo-inverse receiver. The pseudo-inverse may also be used to define EVM for transmit diversity with an arbitrary number of antennas.

Figure 3:
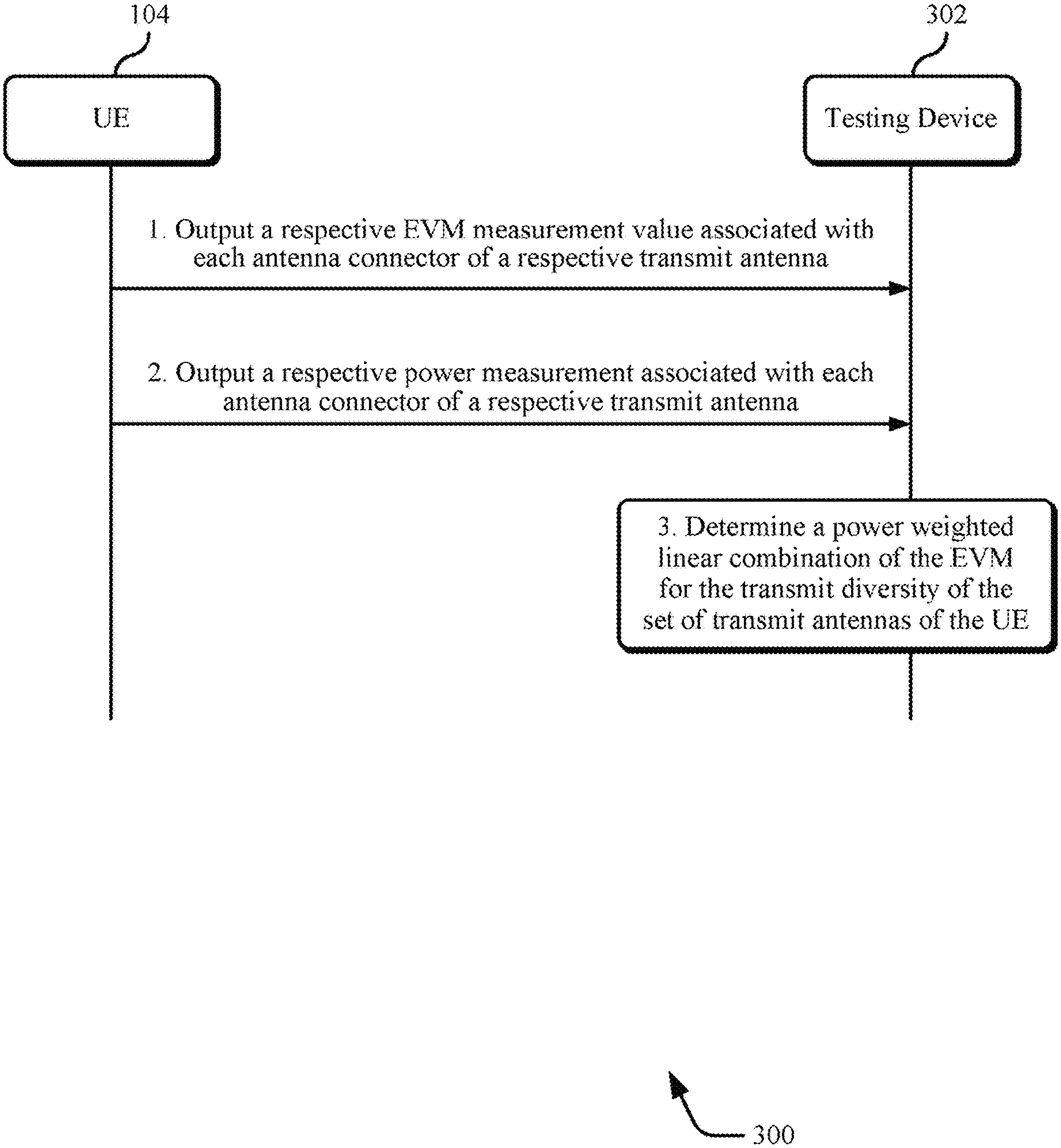
FIG. 3 illustrates an example of a signaling diagram that supports EVM for transmit diversity in accordance with aspects of the present disclosure.

FIG. 3 illustrates an example 300 of a signaling diagram that supports EVM for transmit diversity in accordance with aspects of the present disclosure. A communication device (e.g., a UE 104) includes at least a transceiver, a set of transmit antennas (e.g., more than two transmit antennas), and a set of antenna connectors. Each of the antenna connectors couple a signal from the transceiver to a respective one of the transmit antennas. The UE outputs (at step 1) a respective EVM measurement value associated with each antenna connector of a respective transmit antenna. The UE also outputs (at step 2) a respective power measurement associated with each antenna connector of a respective transmit antenna. A testing device 302 receives the EVM measurement values and the power measurements and determines (at step 3) a power weighted linear combination of the EVM for the transmit diversity of the set of transmit antennas of the UE. Although the UE 104 and the testing device 302 are illustrated and described as separate devices and/or components, the testing device or comparable logic may be integrated with the UE.

In an implementation, the power weighted linear combination of the EVM for the transmit diversity is determined by applying a weighting factor to a linear combination of the respective EVM measurement value associated with each respective antenna connector based at least on the respective power measurement associated with each respective antenna connector. The EVM for the transmit diversity is a linear combination of the respective EVM measurement value associated with each respective antenna connector, and is defined as $$EVM \leq \frac{\sum_i P_i EVM_i}{\sum_i P_i},$$

which is a quotient of a summation of respective power measurements multiplied by the respective EVM measurement value associated with each respective antenna connector divided by a summation of the respective power measurements associated with each respective antenna connector.

Figure 4:
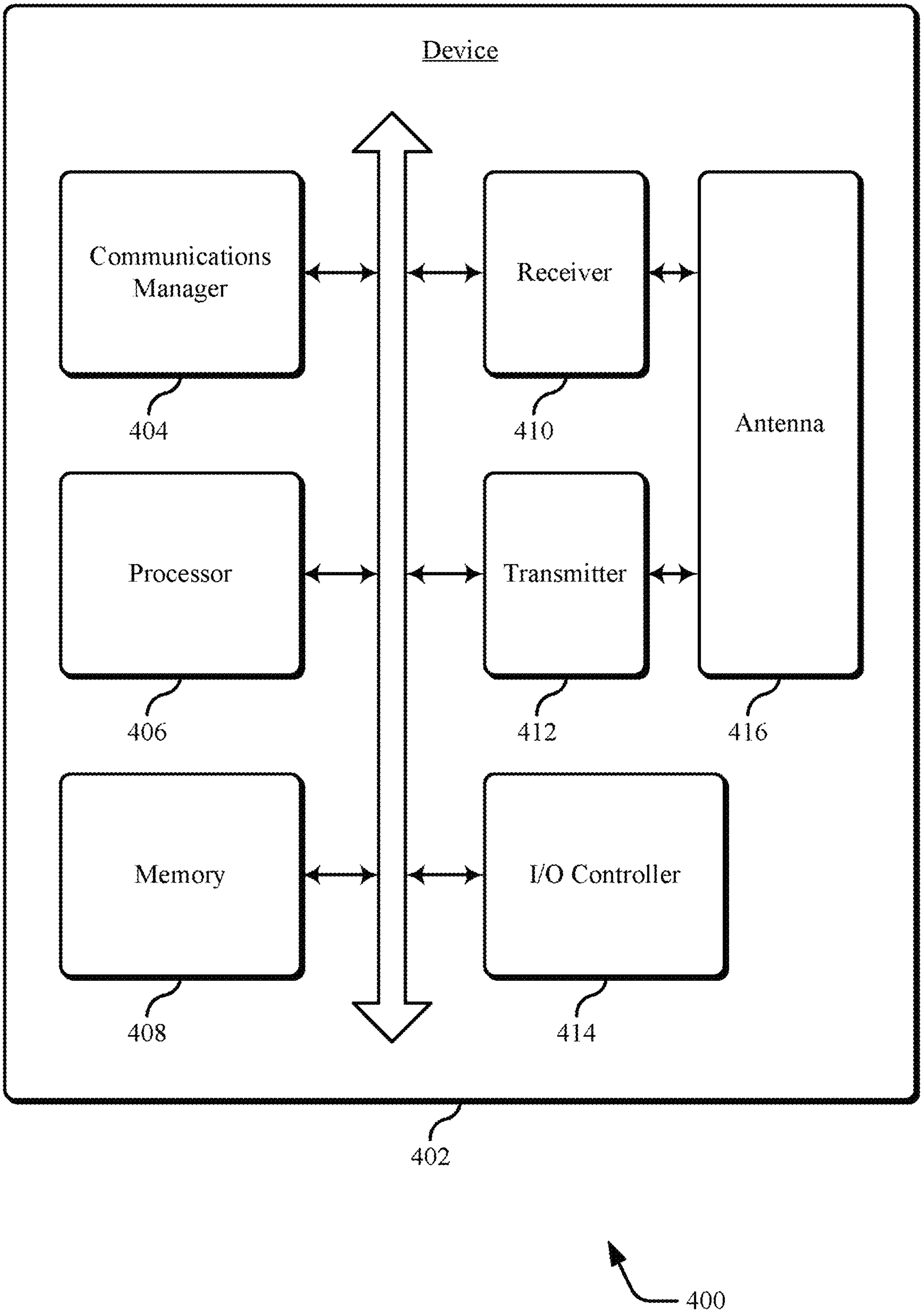
FIG. 4 illustrates an example block diagram of components of a device (e.g., a communication device, a UE) that supports EVM for transmit diversity in accordance with aspects of the present disclosure.

FIG. 4 illustrates an example of a block diagram 400 of a device 402 that supports EVM for transmit diversity in accordance with aspects of the present disclosure. The device 402 may be an example of a UE 104 as described herein. The device 402 may support wireless communication and/or network signaling with one or more base stations 102, other UEs 104, network entities and devices, or any combination thereof. The device 402 may include components for bi-directional communications including components for transmitting and receiving communications, such as a communications manager 404, a processor 406, a memory 408, a receiver 410, a transmitter 412, and an I/O controller 414. These components may be in electronic communication or otherwise coupled (e.g., operatively, communicatively, functionally, electronically, electrically) via one or more interfaces (e.g., buses).

The communications manager 404, the receiver 410, the transmitter 412, or various combinations thereof or various components thereof may be examples of means for performing various aspects of the present disclosure as described herein. For example, the communications manager 404, the receiver 410, the transmitter 412, or various combinations or components thereof may support a method for performing one or more of the functions described herein.

In some implementations, the communications manager 404, the receiver 410, the transmitter 412, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 406 and the memory 408 coupled with the processor 406 may be configured to perform one or more of the functions described herein (e.g., by executing, by the processor 406, instructions stored in the memory 408).

Additionally or alternatively, in some implementations, the communications manager 404, the receiver 410, the transmitter 412, or various combinations or components thereof may be implemented in code (e.g., as communications management software or firmware) executed by the processor 406. If implemented in code executed by the processor 406, the functions of the communications manager 404, the receiver 410, the transmitter 412, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the communications manager 404 may be configured to perform various operations (e.g., receiving, monitoring, transmitting) using or otherwise in cooperation with the receiver 410, the transmitter 412, or both. For example, the communications manager 404 may receive information from the receiver 410, send information to the transmitter 412, or be integrated in combination with the receiver 410, the transmitter 412, or both to receive information, transmit information, or perform various other operations as described herein. Although the communications manager 404 is illustrated as a separate component, in some implementations, one or more functions described with reference to the communications manager 404 may be supported by or performed by the processor 406, the memory 408, or any combination thereof. For example, the memory 408 may store code, which may include instructions executable by the processor 406 to cause the device 402 to perform various aspects of the present disclosure as described herein, or the processor 406 and the memory 408 may be otherwise configured to perform or support such operations.

For example, the communications manager 404 may support wireless communication and/or network signaling at a device (e.g., the device 402, a UE) in accordance with examples as disclosed herein. The communications manager 404 and/or other device components may be configured as or otherwise support an apparatus, such as a communication device (e.g., a UE), including a transceiver; a set of transmit antennas; a set of antenna connectors, each of one or more antenna connectors of the set of antenna connectors configured to couple a signal from the transceiver to a respective transmit antenna of the set of transmit antennas; a processor configured to cause the apparatus to output an EVM measurement value associated with each respective antenna connector of the one or more antenna connectors for a determination of EVM for a transmit diversity of the set of transmit antennas.

Additionally, the apparatus (e.g., a communication device, UE) includes any one or combination of: the set of transmit antennas comprises more than two transmit antennas. The set of transmit antennas comprises four transmit antennas. The determination of the EVM for the transmit diversity of the set of transmit antennas is based at least in part on a linear combination of the respective EVM measurement value associated with each respective antenna connector of the one or more antenna connectors. The processor is configured to cause the apparatus to output a respective power measurement associated with each respective antenna connector of the one or more antenna connectors for a determination of a power weighted linear combination of the EVM for the transmit diversity of the set of transmit antennas. The power weighted linear combination of the EVM for the transmit diversity is determined by applying a weighting factor to a linear combination of the respective EVM measurement value associated with each respective antenna connector based at least in part on the respective power measurement associated with each respective antenna connector of the one or more antenna connectors. A linear combination of the respective EVM measurement value associated with each respective antenna connector of the one or more antenna connectors is based at least in part on a correlation of noise values associated with the apparatus. The EVM for the transmit diversity is a linear combination of the respective EVM measurement value associated with each respective antenna connector of the one or more antenna connectors, and is defined as $$EVM \leq \frac{\sum_i P_i EVM_i}{\sum_i P_i}.$$

The EVM for the transmit diversity is defined as a quotient of a summation of respective power measurements multiplied by the respective EVM measurement value associated with each respective antenna connector of the one or more antenna connectors divided by a summation of the respective power measurements associated with each respective antenna connector of the one or more antenna connectors.

In another example, the communications manager 404 and/or other device components may be configured as or otherwise support an apparatus, such as a communication device (e.g., a UE), including a set of transmit antennas for which an EVM for transmit diversity is determinable from a linear combination of a respective EVM measurement value for each of the transmit antennas of the set of transmit antennas.

Additionally, the apparatus (e.g., a communication device, UE) includes any one or combination of: the set of transmit antennas comprises more than two transmit antennas. The set of transmit antennas comprises four transmit antennas. The respective EVM measurement value of a respective transmit antenna of the set of transmit antennas is output from a set of antenna connectors, each of one or more antenna connectors of the set of antenna connectors configured to couple a signal from a transceiver to a respective transmit antenna of the set of transmit antennas. The linear combination of the respective EVM measurement values is a power weighted linear combination based at least in part on a respective output power measurement associated with a respective antenna connector of a respective transmit antenna of the set of transmit antennas. The power weighted linear combination of the EVM for the transmit diversity is determined by applying a weighting factor to a linear combination of the respective EVM measurement value associated with each respective antenna connector based at least in part on the respective output power measurement associated with a respective antenna connector of a respective transmit antenna of the set of transmit antennas. The linear combination of the respective EVM measurement value associated with each respective transmit antenna of the set of transmit antennas is based at least in part on a correlation of noise values associated with the apparatus. The EVM for the transmit diversity is defined as a quotient of a summation of respective power measurements multiplied by the respective EVM measurement value associated with each respective transmit antenna of the set of transmit antennas divided by a summation of the respective power measurements associated with each respective transmit antenna of the set of transmit antennas.

The communications manager 404 and/or other device components may be configured as or otherwise support a means for wireless communication and/or network signaling at a communication device (e.g., a UE), including receiving a signal communicated from a transceiver to a set of transmit antennas, the signal received at a set of antenna connectors, each of one or more antenna connectors of the set of antenna connectors configured to couple the signal from the transceiver to a respective transmit antenna of the set of transmit antennas; and outputting a respective EVM measurement value associated with each respective antenna connector of the one or more antenna connectors for a determination of EVM for a transmit diversity of the set of transmit antennas.

Additionally, wireless communication and/or network signaling at the communication device includes any one or combination of: outputting a respective power measurement associated with each respective antenna connector of the one or more antenna connectors for a determination of a power weighted linear combination of the EVM for the transmit diversity of the set of transmit antennas. The power weighted linear combination of the EVM for the transmit diversity is determined by applying a weighting factor to a linear combination of the respective EVM measurement value associated with each respective antenna connector based at least in part on the respective power measurement associated with each respective antenna connector of the one or more antenna connectors. The EVM for transmit diversity of the set of transmit antennas is determinable based at least in part on a linear combination of the respective EVM measurement value associated with each respective antenna connector of the one or more antenna connectors. The set of transmit antennas comprises more than two transmit antennas. The set of transmit antennas comprises four transmit antennas. A linear combination of the respective EVM measurement value associated with each respective antenna connector of the one or more antenna connectors is based at least in part on a correlation of noise values associated with the transceiver. The EVM for the transmit diversity is defined as a quotient of a summation of respective power measurements multiplied by the respective EVM measurement value associated with each respective antenna connector of the one or more antenna connectors divided by a summation of the respective power measurements associated with each respective antenna connector of the one or more antenna connectors.

The processor 406 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 406 may be configured to operate a memory array using a memory controller. In some other implementations, a memory controller may be integrated into the processor 406. The processor 406 may be configured to execute computer-readable instructions stored in a memory (e.g., the memory 408) to cause the device 402 to perform various functions of the present disclosure.

The memory 408 may include random access memory (RAM) and read-only memory (ROM). The memory 408 may store computer-readable, computer-executable code including instructions that, when executed by the processor 406 cause the device 402 to perform various functions described herein. The code may be stored in a non-transitory computer-readable medium such as system memory or another type of memory. In some implementations, the code may not be directly executable by the processor 406 but may cause a computer (e.g., when compiled and executed) to perform functions described herein. In some implementations, the memory 408 may include, among other things, a basic I/O system (BIOS) which may control basic hardware or software operation such as the interaction with peripheral components or devices.

The I/O controller 414 may manage input and output signals for the device 402. The I/O controller 414 may also manage peripherals not integrated into the device 402. In some implementations, the I/O controller 414 may represent a physical connection or port to an external peripheral. In some implementations, the I/O controller 414 may utilize an operating system such as iOS®, ANDROID®, MS-DOS®, MS-WINDOWS®, OS/2®, UNIX®, LINUX®, or another known operating system. In some implementations, the I/O controller 414 may be implemented as part of a processor, such as the processor 406. In some implementations, a user may interact with the device 402 via the I/O controller 414 or via hardware components controlled by the I/O controller 414.

In some implementations, the device 402 may include a single antenna 416. However, in some other implementations, the device 402 may have more than one antenna 416, which may be capable of concurrently transmitting or receiving multiple wireless transmissions. The receiver 410 and the transmitter 412 may communicate bi-directionally, via the one or more antennas 416, wired, or wireless links as described herein. For example, the receiver 410 and the transmitter 412 may represent a wireless transceiver and may communicate bi-directionally with another wireless transceiver. The transceiver may also include a modem to modulate the packets, to provide the modulated packets to one or more antennas 416 for transmission, and to demodulate packets received from the one or more antennas 416.

Figure 5:
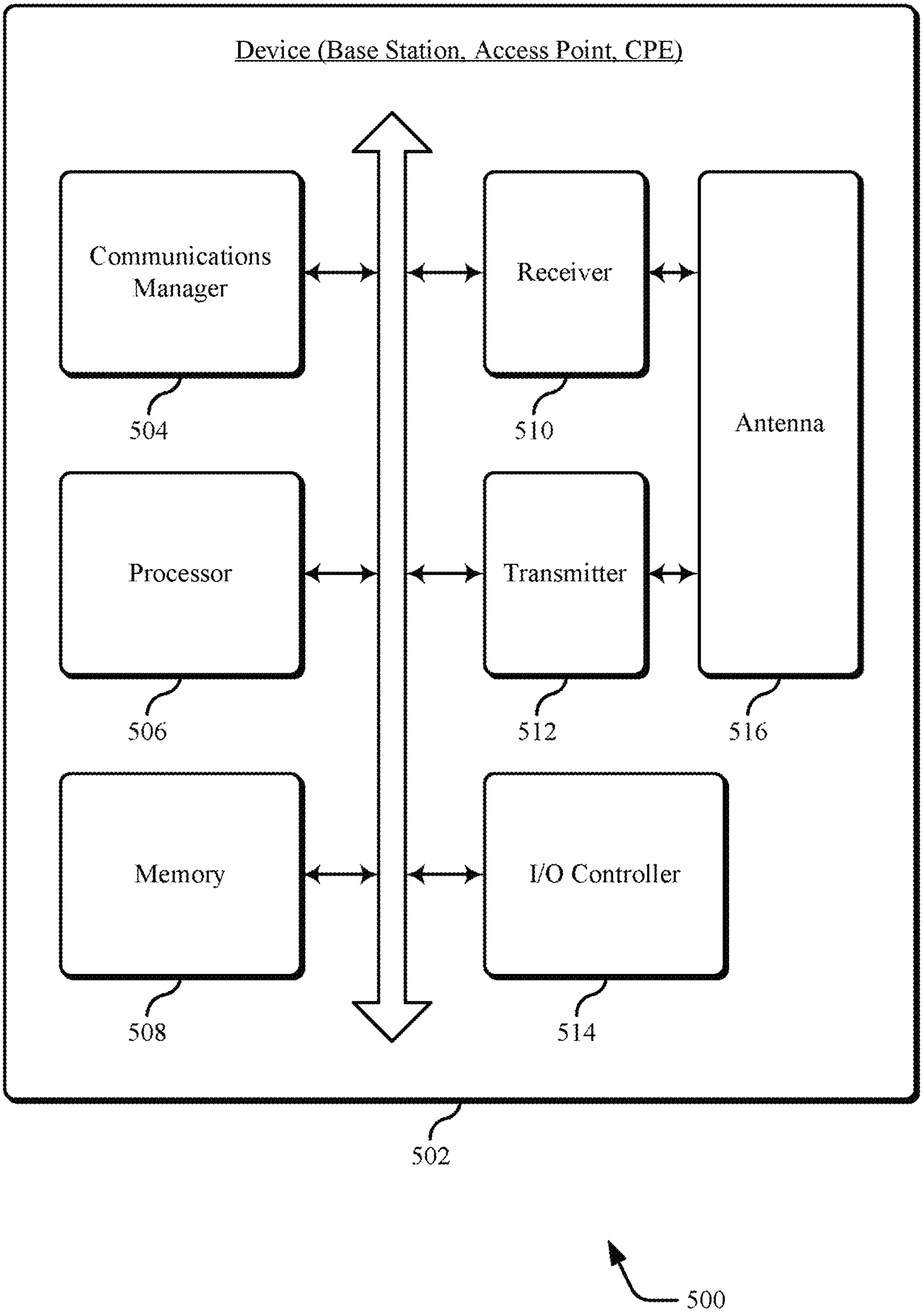
FIG. 5 illustrates an example block diagram of components of a device (e.g., a gNB, base station, CPE) that supports EVM for transmit diversity in accordance with aspects of the present disclosure.

FIG. 5 illustrates an example of a block diagram 500 of a device 502 that supports EVM for transmit diversity in accordance with aspects of the present disclosure. The device 502 may be an example of a base station 102 (such as a gNB), access point, or any other type of CPE as described herein. The device 502 may support wireless communication and/or network signaling with one or more base stations 102, other UEs 104, core network devices and functions (e.g., core network 106), or any combination thereof. The device 502 may include components for bi-directional communications including components for transmitting and receiving communications, such as a communications manager 504, a processor 506, a memory 508, a receiver 510, a transmitter 512, and an I/O controller 514. These components may be in electronic communication or otherwise coupled (e.g., operatively, communicatively, functionally, electronically, electrically) via one or more interfaces (e.g., buses).

The communications manager 504, the receiver 510, the transmitter 512, or various combinations thereof or various components thereof may be examples of means for performing various aspects of the present disclosure as described herein. For example, the communications manager 504, the receiver 510, the transmitter 512, or various combinations or components thereof may support a method for performing one or more of the functions described herein.

In some implementations, the communications manager 504, the receiver 510, the transmitter 512, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 506 and the memory 508 coupled with the processor 506 may be configured to perform one or more of the functions described herein (e.g., by executing, by the processor 506, instructions stored in the memory 508).

Additionally or alternatively, in some implementations, the communications manager 504, the receiver 510, the transmitter 512, or various combinations or components thereof may be implemented in code (e.g., as communications management software or firmware) executed by the processor 506. If implemented in code executed by the processor 506, the functions of the communications manager 504, the receiver 510, the transmitter 512, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the communications manager 504 may be configured to perform various operations (e.g., receiving, monitoring, transmitting) using or otherwise in cooperation with the receiver 510, the transmitter 512, or both. For example, the communications manager 504 may receive information from the receiver 510, send information to the transmitter 512, or be integrated in combination with the receiver 510, the transmitter 512, or both to receive information, transmit information, or perform various other operations as described herein. Although the communications manager 504 is illustrated as a separate component, in some implementations, one or more functions described with reference to the communications manager 504 may be supported by or performed by the processor 506, the memory 508, or any combination thereof. For example, the memory 508 may store code, which may include instructions executable by the processor 506 to cause the device 502 to perform various aspects of the present disclosure as described herein, or the processor 506 and the memory 508 may be otherwise configured to perform or support such operations.

For example, the communications manager 504 may support wireless communication and/or network signaling at a device (e.g., the device 502, a gNB, base station, access point, CPE, and the like) in accordance with examples as disclosed herein. The communications manager 504 and/or other device components may be configured as or otherwise support an apparatus, such as a gNB, base station, CPE, or other network device, including a transceiver; a set of transmit antennas; a set of antenna connectors, each of one or more antenna connectors of the set of antenna connectors configured to couple a signal from the transceiver to a respective transmit antenna of the set of transmit antennas; a processor configured to cause the apparatus to output an EVM measurement value associated with each respective antenna connector of the one or more antenna connectors for a determination of EVM for a transmit diversity of the set of transmit antennas.

Additionally, the apparatus (e.g., a gNB, base station, access point, CPE, and the like) includes any one or combination of: the set of transmit antennas comprises more than two transmit antennas. The set of transmit antennas comprises four transmit antennas. The determination of the EVM for the transmit diversity of the set of transmit antennas is based at least in part on a linear combination of the respective EVM measurement value associated with each respective antenna connector of the one or more antenna connectors. The processor is configured to cause the apparatus to output a respective power measurement associated with each respective antenna connector of the one or more antenna connectors for a determination of a power weighted linear combination of the EVM for the transmit diversity of the set of transmit antennas. The power weighted linear combination of the EVM for the transmit diversity is determined by applying a weighting factor to a linear combination of the respective EVM measurement value associated with each respective antenna connector based at least in part on the respective power measurement associated with each respective antenna connector of the one or more antenna connectors. A linear combination of the respective EVM measurement value associated with each respective antenna connector of the one or more antenna connectors is based at least in part on a correlation of noise values associated with the apparatus. The EVM for the transmit diversity is a linear combination of the respective EVM measurement value associated with each respective antenna connector of the one or more antenna connectors, and is defined as $$EVM \leq \frac{\sum_i P_i EVM_i}{\sum_i P_i}.$$

The EVM for the transmit diversity is defined as a quotient of a summation of respective power measurements multiplied by the respective EVM measurement value associated with each respective antenna connector of the one or more antenna connectors divided by a summation of the respective power measurements associated with each respective antenna connector of the one or more antenna connectors.

In another example, the communications manager 504 and/or other device components may be configured as or otherwise support an apparatus, such as a gNB, base station, CPE, or other network device, including a set of transmit antennas for which an EVM for transmit diversity is determinable from a linear combination of a respective EVM measurement value for each of the transmit antennas of the set of transmit antennas.

Additionally, the apparatus (e.g., a gNB, base station, access point, CPE, and the like) includes any one or combination of: the set of transmit antennas comprises more than two transmit antennas. The set of transmit antennas comprises four transmit antennas. The respective EVM measurement value of a respective transmit antenna of the set of transmit antennas is output from a set of antenna connectors, each of one or more antenna connectors of the set of antenna connectors configured to couple a signal from a transceiver to a respective transmit antenna of the set of transmit antennas. The linear combination of the respective EVM measurement values is a power weighted linear combination based at least in part on a respective output power measurement associated with a respective antenna connector of a respective transmit antenna of the set of transmit antennas. The power weighted linear combination of the EVM for the transmit diversity is determined by applying a weighting factor to a linear combination of the respective EVM measurement value associated with each respective antenna connector based at least in part on the respective output power measurement associated with a respective antenna connector of a respective transmit antenna of the set of transmit antennas. The linear combination of the respective EVM measurement value associated with each respective transmit antenna of the set of transmit antennas is based at least in part on a correlation of noise values associated with the apparatus. The EVM for the transmit diversity is defined as a quotient of a summation of respective power measurements multiplied by the respective EVM measurement value associated with each respective transmit antenna of the set of transmit antennas divided by a summation of the respective power measurements associated with each respective transmit antenna of the set of transmit antennas.

The communications manager 504 and/or other device components may be configured as or otherwise support a means for wireless communication and/or network signaling at a gNB, base station, access point, CPE, or other network device, including receiving a signal communicated from a transceiver to a set of transmit antennas, the signal received at a set of antenna connectors, each of one or more antenna connectors of the set of antenna connectors configured to couple the signal from the transceiver to a respective transmit antenna of the set of transmit antennas; and outputting a respective EVM measurement value associated with each respective antenna connector of the one or more antenna connectors for a determination of EVM for a transmit diversity of the set of transmit antennas.

Additionally, wireless communication at the gNB, base station, access point, CPE, or other network device includes any one or combination of: outputting a respective power measurement associated with each respective antenna connector of the one or more antenna connectors for a determination of a power weighted linear combination of the EVM for the transmit diversity of the set of transmit antennas. The power weighted linear combination of the EVM for the transmit diversity is determined by applying a weighting factor to a linear combination of the respective EVM measurement value associated with each respective antenna connector based at least in part on the respective power measurement associated with each respective antenna connector of the one or more antenna connectors. The EVM for transmit diversity of the set of transmit antennas is determinable based at least in part on a linear combination of the respective EVM measurement value associated with each respective antenna connector of the one or more antenna connectors. The set of transmit antennas comprises more than two transmit antennas. The set of transmit antennas comprises four transmit antennas. A linear combination of the respective EVM measurement value associated with each respective antenna connector of the one or more antenna connectors is based at least in part on a correlation of noise values associated with the transceiver. The EVM for the transmit diversity is defined as a quotient of a summation of respective power measurements multiplied by the respective EVM measurement value associated with each respective antenna connector of the one or more antenna connectors divided by a summation of the respective power measurements associated with each respective antenna connector of the one or more antenna connectors.

The processor 506 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 506 may be configured to operate a memory array using a memory controller. In some other implementations, a memory controller may be integrated into the processor 506. The processor 506 may be configured to execute computer-readable instructions stored in a memory (e.g., the memory 508) to cause the device 502 to perform various functions of the present disclosure.

The memory 508 may include random access memory (RAM) and read-only memory (ROM). The memory 508 may store computer-readable, computer-executable code including instructions that, when executed by the processor 506 cause the device 502 to perform various functions described herein. The code may be stored in a non-transitory computer-readable medium such as system memory or another type of memory. In some implementations, the code may not be directly executable by the processor 506 but may cause a computer (e.g., when compiled and executed) to perform functions described herein. In some implementations, the memory 508 may include, among other things, a basic I/O system (BIOS) which may control basic hardware or software operation such as the interaction with peripheral components or devices.

The I/O controller 514 may manage input and output signals for the device 502. The I/O controller 514 may also manage peripherals not integrated into the device 502. In some implementations, the I/O controller 514 may represent a physical connection or port to an external peripheral. In some implementations, the I/O controller 514 may utilize an operating system such as iOS®, ANDROID®, MS-DOS®, MS-WINDOWS®, OS/2®, UNIX®, LINUX®, or another known operating system. In some implementations, the I/O controller 514 may be implemented as part of a processor, such as the processor 506. In some implementations, a user may interact with the device 502 via the I/O controller 514 or via hardware components controlled by the I/O controller 514.

In some implementations, the device 502 may include a single antenna 516. However, in some other implementations, the device 502 may have more than one antenna 516, which may be capable of concurrently transmitting or receiving multiple wireless transmissions. The receiver 510 and the transmitter 512 may communicate bi-directionally, via the one or more antennas 516, wired, or wireless links as described herein. For example, the receiver 510 and the transmitter 512 may represent a wireless transceiver and may communicate bi-directionally with another wireless transceiver. The transceiver may also include a modem to modulate the packets, to provide the modulated packets to one or more antennas 516 for transmission, and to demodulate packets received from the one or more antennas 516.

Figure 6:
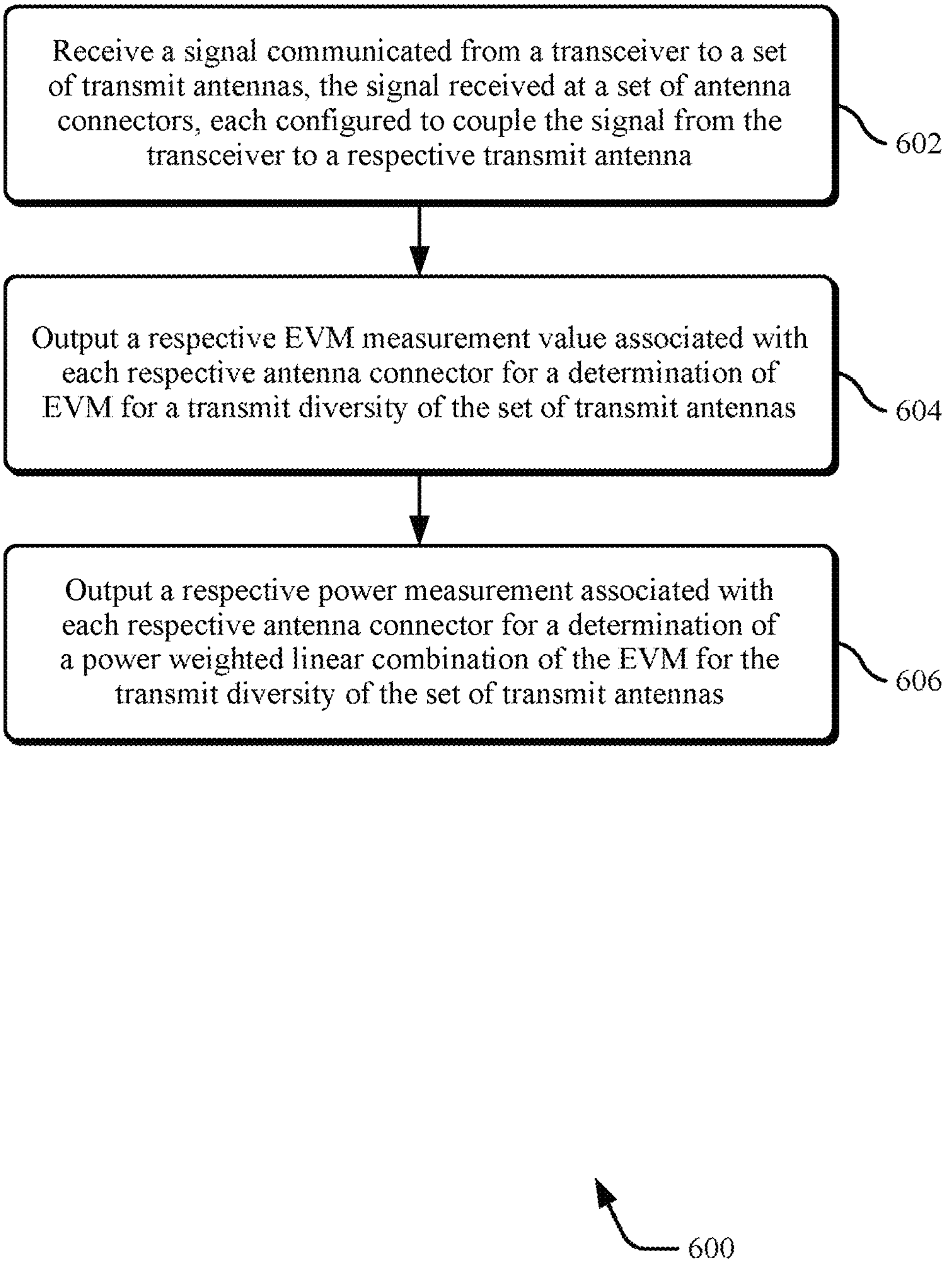
FIGS. 6 and 7 illustrate flowcharts of methods that support EVM for transmit diversity in accordance with aspects of the present disclosure.

FIG. 6 illustrates a flowchart of a method 600 that supports EVM for transmit diversity in accordance with aspects of the present disclosure. The operations of the method 600 may be implemented and performed by a device or its components, such as a UE 104 as described with reference to FIGS. 1 through 5. In some implementations, the device may execute a set of instructions to control the function elements of the device to perform the described functions. Additionally, or alternatively, the device may perform aspects of the described functions using special-purpose hardware.

At 602, the method may include receiving a signal communicated from a transceiver to a set of transmit antennas, the signal received at a set of antenna connectors, each configured to couple the signal from the transceiver to a respective transmit antenna. The operations of 602 may be performed in accordance with examples as described herein. In some implementations, aspects of the operations of 602 may be performed by a device as described with reference to FIG. 1.

At 604, the method may include outputting a respective EVM measurement value associated with each respective antenna connector for a determination of EVM for a transmit diversity of the set of transmit antennas. The operations of 604 may be performed in accordance with examples as described herein. In some implementations, aspects of the operations of 604 may be performed by a device as described with reference to FIG. 1.

At 606, the method may include outputting a respective power measurement associated with each respective antenna connector for a determination of a power weighted linear combination of the EVM for the transmit diversity of the set of transmit antennas. The operations of 606 may be performed in accordance with examples as described herein. In some implementations, aspects of the operations of 606 may be performed by a device as described with reference to FIG. 1.

Figure 7:
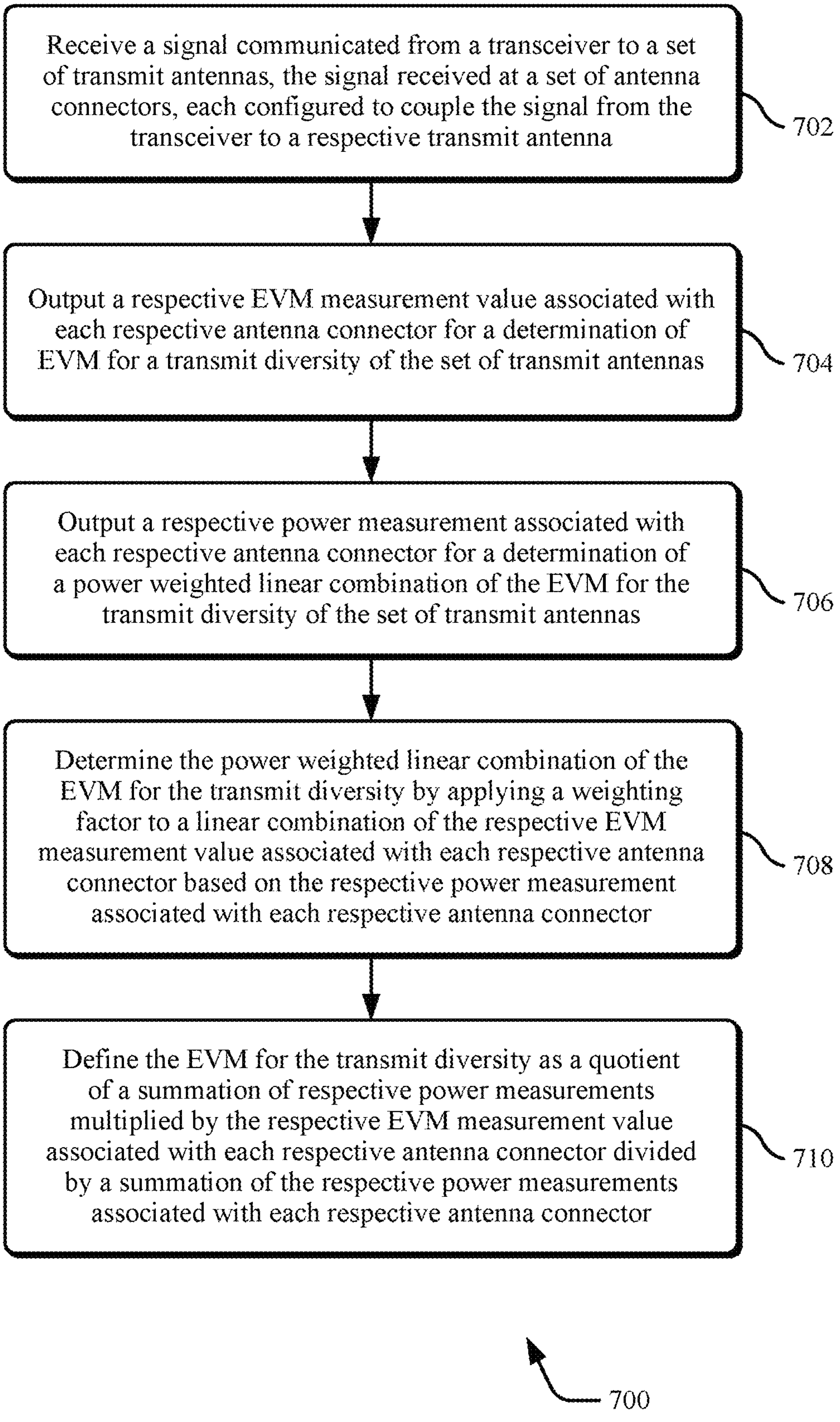

FIG. 7 illustrates a flowchart of a method 700 that supports EVM for transmit diversity in accordance with aspects of the present disclosure. The operations of the method 700 may be implemented and performed by a device or its components, such as a UE 104 as described with reference to FIGS. 1 through 5. In some implementations, the device may execute a set of instructions to control the function elements of the device to perform the described functions. Additionally, or alternatively, the device may perform aspects of the described functions using special-purpose hardware.

At 702, the method may include receiving a signal communicated from a transceiver to a set of transmit antennas, the signal received at a set of antenna connectors, each configured to couple the signal from the transceiver to a respective transmit antenna. The operations of 702 may be performed in accordance with examples as described herein. In some implementations, aspects of the operations of 702 may be performed by a device as described with reference to FIG. 1.

At 704, the method may include outputting a respective EVM measurement value associated with each respective antenna connector for a determination of EVM for a transmit diversity of the set of transmit antennas. The operations of 704 may be performed in accordance with examples as described herein. In some implementations, aspects of the operations of 704 may be performed by a device as described with reference to FIG. 1.

At 706, the method may include outputting a respective power measurement associated with each respective antenna connector for a determination of a power weighted linear combination of the EVM for the transmit diversity of the set of transmit antennas. The operations of 706 may be performed in accordance with examples as described herein. In some implementations, aspects of the operations of 706 may be performed by a device as described with reference to FIG. 1.

At 708, the method may include determining the power weighted linear combination of the EVM for the transmit diversity by applying a weighting factor to a linear combination of the respective EVM measurement value associated with each respective antenna connector based on the respective power measurement associated with each respective antenna connector. The operations of 708 may be performed in accordance with examples as described herein. In some implementations, aspects of the operations of 708 may be performed by a device as described with reference to FIG. 1.

At 710, the method may include defining the EVM for the transmit diversity as a quotient of a summation of respective power measurements multiplied by the respective EVM measurement value associated with each respective antenna connector divided by a summation of the respective power measurements associated with each respective antenna connector. The operations of 710 may be performed in accordance with examples as described herein. In some implementations, aspects of the operations of 710 may be performed by a device as described with reference to FIG. 1.

It should be noted that the methods described herein describe possible implementations, and that the operations and the steps may be rearranged or otherwise modified and that other implementations are possible. Further, aspects from two or more of the methods may be combined. The order in which the methods are described is not intended to be construed as a limitation, and any number or combination of the described method operations may be performed in any order to perform a method, or an alternate method.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor.

Any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C, or AB or AC or BC, or ABC (i.e., A and B and C). Similarly, a list of one or more of A, B, or C means A or B or C, or AB or AC or BC, or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Further, as used herein, including in the claims, a "set" may include one or more elements.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form to avoid obscuring the concepts of the described example.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:

a transceiver;

a set of transmit antennas;

a set of antenna connectors, each of one or more antenna connectors of the set of antenna connectors configured to couple a signal from the transceiver to a respective transmit antenna of the set of transmit antennas; and at least one processor coupled with at least one memory and operable to cause the UE to output respective error vector magnitude (EVM) measurement values associated with the one or more antenna connectors, wherein an EVM for a transmit diversity of the set of transmit antennas is based at least in part on a first summation of products of the respective EVM measurement values and respective power measurements associated with the one or more antenna connectors divided by a second summation of the respective power measurements associated with the one or more antenna connectors.

2. The UE of claim 1, wherein the set of transmit antennas comprises at least one of more than two transmit antennas or four transmit antennas.

3. The UE of claim 1, wherein the EVM for the transmit diversity of the set of transmit antennas is based at least in part on a linear combination of the respective EVM measurement values associated with the one or more antenna connectors.

4. The UE of claim 1, wherein the at least one processor is further operable to cause the UE to output respective power measurement values associated with the one or more antenna connectors, wherein a power weighted linear combination of the EVM for the transmit diversity of the set of transmit antennas is based at least in part on the respective power measurement values.

5. The UE of claim 4, wherein the at least one processor is further operable to cause the UE to determine the power weighted linear combination of the EVM for the transmit diversity by applying a weighting factor to a linear combination of the respective EVM measurement values associated with the one or more antenna connectors based at least in part on the respective power measurement values associated with the one or more antenna connectors.

6. The UE of claim 1, wherein a linear combination of the respective EVM measurement values associated with the one or more antenna connectors is based at least in part on a correlation of noise values associated with the UE.

7. The UE of claim 1, wherein the EVM for the transmit diversity is a linear combination of the respective EVM measurement values associated with the one or more antenna connectors, and the EVM is defined as at least one of $$EVM \leq \frac{\sum_i P_i EVM_i}{\sum_i P_i}, \text{ or } EVM = \frac{\sum_i P_i EVM_i}{\sum_i P_i}.$$

wherein $P_i$ is a power measurement at an i-th antenna connector, and wherein $EVM_i$ is an EVM measurement value at the i-th antenna connector.

8. The UE of claim 1, wherein the at least one processor is further operable to cause the UE to:

determine, based at least in part on the EVM for the transmit diversity of the set of transmit antennas, a transmit power associated with the set of transmit antennas; and transmit signaling using the transmit power.

9. A user equipment (UE) for wireless communication, comprising:

at least one memory; and at least one processor coupled with the at least one memory and operable to cause the UE to:

receive, at a set of antenna connectors, a signal communicated from a transceiver to a set of transmit antennas, wherein the set of antenna connectors is configured to couple the signal from the transceiver to respective transmit antennas of the set of transmit antennas; and output respective error vector magnitude (EVM) measurement values associated with one or more antenna connectors of the set of antenna connectors, wherein an EVM for a transmit diversity of the set of transmit antennas is based at least in part on a first summation of products of the respective EVM measurement values and respective power measurements associated with the one or more antenna connectors divided by a second summation of the respective power measurements associated with the one or more antenna connectors.

10. The UE of claim 9, wherein the set of transmit antennas comprises at least one of more than two transmit antennas or four transmit antennas.

11. The UE of claim 9, wherein the respective EVM measurement values of the set of transmit antennas are output from the one or more antenna connectors.

12. The UE of claim 9, wherein a linear combination of the respective EVM measurement values is a power weighted linear combination based at least in part on respective output power measurement values associated with the one or more antenna connectors.

13. The UE of claim 12, wherein the power weighted linear combination of the EVM for the transmit diversity is determined by applying a weighting factor to the linear combination of the respective EVM measurement values associated with the one or more antenna connectors based at least in part on the respective output power measurement values associated with the one or more antenna connectors.

14. The UE of claim 9, wherein a linear combination of the respective EVM measurement values associated with the one or more antenna connectors is based at least in part on a correlation of noise values associated with the UE.

15. A method performed by a user equipment (UE), the method comprising:

receiving, at a set of antenna connectors, a signal communicated from a transceiver to a set of transmit antennas, wherein the set of antenna connectors is configured to couple the signal from the transceiver to respective transmit antennas of the set of transmit antennas; and outputting respective error vector magnitude (EVM) measurement values associated with one or more antenna connectors of the set of antenna connectors, wherein an EVM for a transmit diversity of the set of transmit antennas is based at least in part on a first summation of products of the respective EVM measurement values and respective power measurements associated with the one or more antenna connectors divided by a second summation of the respective power measurements associated with the one or more antenna connectors.

16. The method of claim 15, further comprising:

determining, based at least in part on the EVM for the transmit diversity of the set of transmit antennas, a transmit power associated with the set of transmit antennas; and transmitting signaling using the transmit power.

17. A processor for wireless communication, comprising:

at least one controller coupled with at least one memory and operable to cause the processor to:

receive, at a set of antenna connectors, a signal communicated from a transceiver to a set of transmit antennas, wherein the set of antenna connectors is configured to couple the signal from the transceiver to respective transmit antennas of the set of transmit antennas; and output respective error vector magnitude (EVM) measurement values associated with one or more antenna connectors of the set of antenna connectors, wherein an EVM for a transmit diversity of the set of transmit antennas is based at least in part on a first summation of products of the respective EVM measurement values and respective power measurements associated with the one or more antenna connectors divided by a second summation of the respective power measurements associated with the one or more antenna connectors.

18. The processor of claim 17, wherein the set of transmit antennas comprises at least one of more than two transmit antennas or four transmit antennas.

19. The processor of claim 17, wherein the EVM for the transmit diversity of the set of transmit antennas is based at least in part on a linear combination of the respective EVM measurement values associated with the one or more antenna connectors.

20. The processor of claim 17, wherein the at least one controller is further operable to cause the processor to:

determine, based at least in part on the EVM for the transmit diversity of the set of transmit antennas, a transmit power associated with the set of transmit antennas; and transmit signaling using the transmit power.

* * * * *